No. 752,154. PATENTED FEB. 16, 1904.
G. HACKER.
WATERING APPARATUS FOR POULTRY HOUSES.
APPLICATION FILED JAN. 15, 1903. RENEWED DEC. 26, 1903.
NO MODEL. 2 SHEETS—SHEET 1.
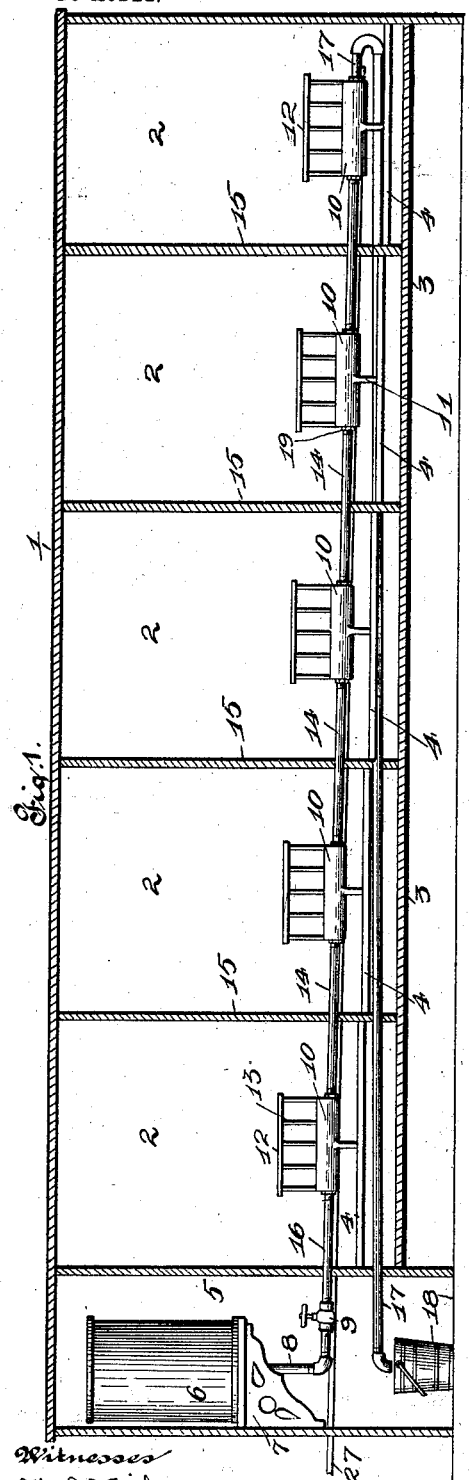
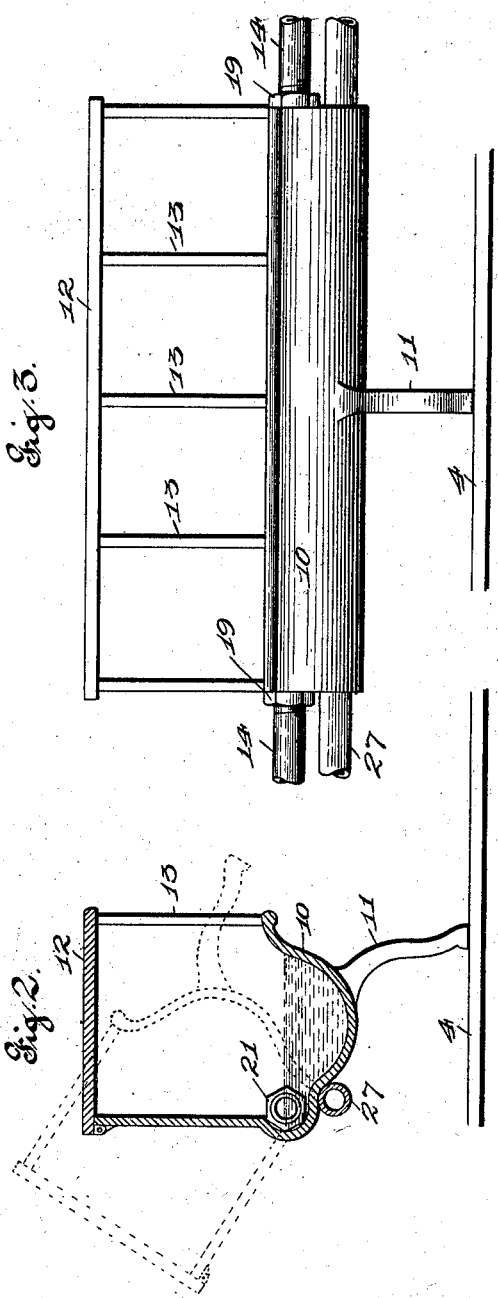

No. 752,154. PATENTED FEB. 16, 1904.
G. HACKER.
WATERING APPARATUS FOR POULTRY HOUSES.
APPLICATION FILED JAN. 15, 1903. RENEWED DEC. 26, 1903.
NO MODEL. 2 SHEETS—SHEET 2.
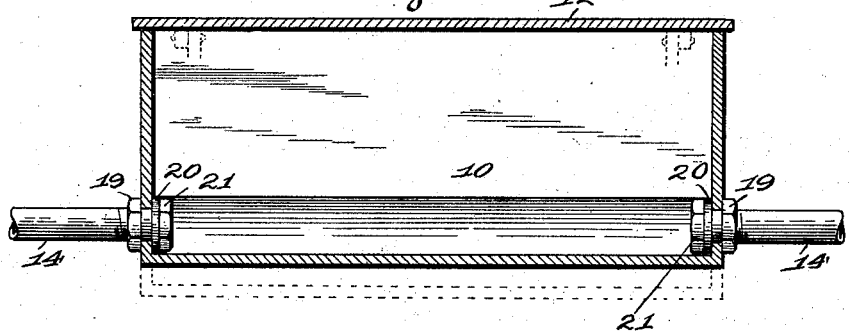
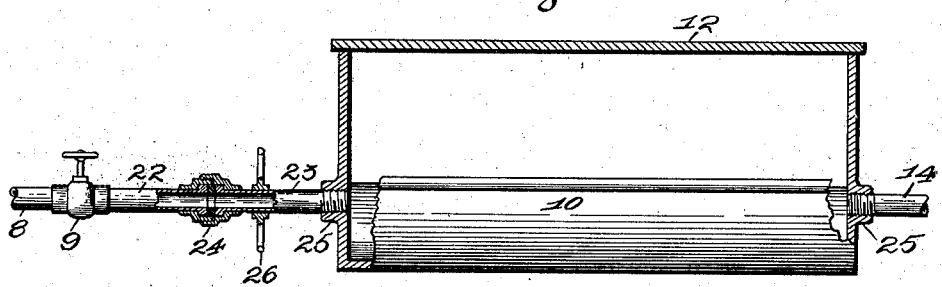

No. 752,154. Patented February 16, 1904.

UNITED STATES PATENT OFFICE.

GEORGE HACKER, OF ST. LOUIS, MISSOURI.

WATERING APPARATUS FOR POULTRY-HOUSES.

SPECIFICATION forming part of Letters Patent No. 752,154, dated February 16, 1904.

Application filed January 15, 1903. Renewed December 26, 1903. Serial No. 186,706. (No model.)

*To all whom it may concern:*

Be it known that I, GEORGE HACKER, of the city of St. Louis, State of Missouri, have invented certain new and useful Improvements in Watering Apparatus for Poultry-Houses, of which the following is a full, clear, and exact description, reference being had to the accompanying drawings, forming a part hereof.

My invention consists in an improved system of water-supply for poultry-houses.

The particular object of my invention is to provide a series of drinking-fountains for that class of poultry-houses that consists of a series of pens.

The further object of my invention is to supply a cheap and readily-adjustable form of drinking-fountains which may be added to a series of such drinking-fountains which have been previously installed, in order that a fountain may be provided for each additional pen that is added in extending old buildings upon a poultry-farm.

Further objects of my invention are to provide a continuous stream of running water for a series of drinking-fountains, means whereby said drinking-fountains may be readily cleaned, means whereby fowls will be prevented from getting into the drinking-fountains or scratching foreign substances into the same, and means whereby the contents of such drinking-fountains will be prevented from freezing.

In the drawings which form a part of this specification, Figure 1 is a longitudinal sectional view of a poultry-house, showing my system of drinking-fountains in place. Fig. 2 is a transverse vertical section of one of my drinking-fountains near its end. Fig. 3 is a front view of one of my drinking-fountains. Fig. 4 is a longitudinal vertical section of one of my drinking-fountains. Fig. 5 is a view showing means which I have provided for emptying the entire series of drinking-fountains in a poultry-house simultaneously, showing portions in section and portions broken away.

In Fig. 1 I have represented in outline a poultry-house 1, consisting of a series of pens 2, provided with a floor 3, each of the pens 2 being provided with a shelf 4. At one end of the house 1 I have provided the compartment 5, within which the supply-tank 6 is mounted by means of a bracket 7. The supply-pipe 8 extends from the bottom of the supply-tank 6 and terminates at the valve 9. In each of the pens 2 I have provided a drinking-fountain 10, having a single leg 11 and a hinged cover 12. From the front edge of the cover 12 the slats 13 depend, so that when the cover 12 is in its normal position the slats 13 serve to close the front fountain in such manner as to admit only the heads of the fowls to the interior of the fountain. The fountains 10 are connected to each other by means of pipe-sections 14 passing through the walls 15, which separate the pens. That one of the fountains 10 which is nearest to the supply-tank 6 is connected to the valve 9 by means of the pipe-section 16. That one of the fountains 10 which is farthest from the supply-tank 6 is provided with the outlet-pipe 17, which is bent downwardly and extends underneath the fountains 10 and into the compartment 5, where it discharges the water into a bucket 18 or other suitable receptacle. The shelves 4 in the pens 2 are arranged as shown in Fig. 1, that in the pen nearest the supply-tank 6 being higher than those in the other pens, and each of the shelves 4 in the remaining pens is at a level lower than those in the pens nearer the supply-tank 6. The legs 11 are normally held by the shelves 4. In this way the necessary fall is secured to keep the water flowing from the supply-tank 6 to the receptacle 18 near the valve 9, as shown. The fountains 10 may be made accessible for purposes of cleaning by raising the covers 12 and the attached slats 13, or the fountains 10 may be emptied by raising the leg 11, throwing the fountain 10 into the position shown in dotted lines in Fig 2 and beyond such position until the contents of fountain 10 is discharged outwardly over the cover 12. When the latter mode of cleaning the fountains 10 is used, it is manifest that the fountains must be pivotedly mounted upon the pipe-sections 14, 16, and 17, which enter them. Such mounting is preferably effected, as shown in Fig. 4, by providing the pipe-sections with nuts 19, which fit closely upon the outer sides of the ends of the fountains 10, the ends of the pipe-section connecting fountains 10 being provided with circular washers 20 and nuts 21.

Where it is desired to provide means for emptying all of the fountains 10 simultaneously and without entering the pens 2, I have provided the means shown in Fig. 5, in which the valve 9 is provided with the supply-pipe 22, which supply-pipe 22 is connected to supply-pipe 23 by the coupler 24 in such manner as to permit the pipe 23 to revolve. In this form of construction the fountain 10 is provided with projecting collars 25, into which the supply-pipe 23 and the connecting-pipes 14 are tightly secured in such manner that the fountains 10 will be rigidly mounted upon their connecting-pipes. In order to revolve the fountain, I have provided the supply-pipe 23 with projecting handles 26, by which the pipes and the fountains mounted thereon may be revolved to discharge the contents of the fountain. By the use of this form of my invention the drinking-fountains in a large number of adjoining pens may be regularly cleaned by emptying their contents without the necessity of an attendant entering any of the pens. In addition to the time and labor saved by such operation this form of my invention is useful in that it assists in keeping the poultry-pens dry during bad weather when they are usually made wet by snow and mud conveyed to them by the feet of the attendant, thus causing dampness and the many forms of disease which result to poultry therefrom, many of which forms of disease, such as roup, are attended with fatal results at times.

In order to prevent the water in my system of drinking-fountains from freezing in cold weather, I have provided a pipe 27, extending through the pens 2 and fitting snugly under the drinking-fountains 10 below the water-level, which pipe is kept warm by steam or hot water, as preferred.

By so depressing the outlet-pipe 17 that it returns to the compartment 5 to empty its discharge the operator is enabled to see from the discharge that all of the fountains 10 of the series have been supplied with fresh water, as there will be no discharge until the fresh supply of water is extended through the entire series.

Having thus described my invention, what I claim as new, and desire to have secured to me by the grant of Letters Patent, is—

1. A system of water-supply for poultry-houses, consisting of a supply-tank, a pipe extending from the bottom of the tank, a valve mounted on the end of the pipe, a series of drinking-fountains, a pipe-section leading from the valve to the first of such fountains, and other pipe-sections connecting the series of fountains to each other, the fountains being arranged successively lower as they are distant, in the series, from the source of supply, and a pipe-section leading from the fountain farthest from the source of supply and adapted to receive the discharge from the series of fountains, substantially as and for the purposes specified.

2. A system of water-supply for poultry-houses, consisting of a supply-tank, a pipe extending from the bottom of the tank, a valve mounted on the end of the pipe adjacent to the tank, a series of drinking-fountains, a pipe-section leading from the valve to the first of such fountains, and other pipe-sections connecting the series of fountains to each other, in such manner that the fountains will be filled by opening the valve, and a pipe-section leading from the fountain farthest from the source of supply to a position adjacent to the source of supply and adapted to receive the discharge from the series of fountains, substantially as and for the purposes specified.

3. A drinking-fountain for fowls comprising a water-receptacle 10, supply and discharge pipe connections for such receptacle about which the latter is arranged to swing to empty the same, a supporting-leg for the receptacle, a pivoted cover 12 arranged above the receptacle, and a series of slats depending from the cover, substantially as set forth.

In testimony whereof I affix my signature in presence of two witnesses.

GEORGE HACKER.

Witnesses:
ALFRED A. EICKS,
MARTIN RAND.